United States Patent
Gjerstad et al.

(10) Patent No.: US 7,398,462 B1
(45) Date of Patent: Jul. 8, 2008

(54) COMMON TEXT FRAMEWORK

(75) Inventors: Kevin B. Gjerstad, Seattle, WA (US);
Yutaka Nakajima, Redmond, WA (US);
Yutaka Suzue, Issaquah, WA (US);
Benjamin M. Westbrook, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 09/557,738

(22) Filed: Apr. 25, 2000

(51) Int. Cl.
*G06F 15/00* (2006.01)
*G06F 17/00* (2006.01)

(52) U.S. Cl. .................. 715/221; 715/223; 715/224; 715/257

(58) Field of Classification Search ........... 715/531, 715/530, 221, 223, 224, 257
See application file for complete search history.

(56) References Cited

U.S. PATENT DOCUMENTS

| | | | | |
|---|---|---|---|---|
| 5,109,439 A | * | 4/1992 | Froessl | 382/305 |
| 5,175,855 A | * | 12/1992 | Putnam et al. | 709/321 |
| 5,511,193 A | * | 4/1996 | Tung et al. | 709/329 |
| 5,524,193 A | * | 6/1996 | Covington et al. | 715/512 |
| 5,659,769 A | * | 8/1997 | Kida et al. | 715/530 |
| 5,802,534 A | * | 9/1998 | Hatayama et al. | 715/530 |
| 5,825,943 A | * | 10/1998 | DeVito et al. | 382/306 |
| 5,946,499 A | * | 8/1999 | Saunders | 710/73 |
| 6,411,974 B1 | * | 6/2002 | Graham et al. | 715/531 |
| 6,466,240 B1 | * | 10/2002 | Maslov | 715/853 |

OTHER PUBLICATIONS

Suhm, et al., "Model-based and Empirical Evaluation of Multimodal Interactive Error Correction", Proceedings of the SIGCHI Conference on Human Factors in Computing Systems, May 1999, pp. 584-591.*

* cited by examiner

*Primary Examiner*—William L Bashore
(74) *Attorney, Agent, or Firm*—Shook, Hardy & Bacon, LLP.

(57) ABSTRACT

A common text framework for application programs having documents of primarily text and input devices for entering and editing text of such documents is disclosed. The framework provides for the interaction of applications and handlers for input devices, and includes a text store interface and a text input processor interface. The former interface permits an application having a document of primarily text to expose the document as an abstraction. The latter interface permits a handler for an input device to access the abstraction of the document and to insert additional text into the document.

12 Claims, 5 Drawing Sheets

COMMON TEXT FRAMEWORK

FIELD OF THE INVENTION

This invention relates generally to applications having documents of primarily text and input (and other) devices for inserting and modifying text within such documents, and more particularly to a common text framework for such applications and such devices to interact with one another.

BACKGROUND OF THE INVENTION

A common application today is the entering, editing and manipulation of text. Application programs that perform such text operation include word processors, text editors, and even spreadsheets and presentation programs. For example, a word processor allows a user to enter text to prepare documents such as letters, reports, memos, etc. Other application programs include e-mail application programs, web browser application programs, etc.

While the keyboard has historically been the standard input device by which text input is performed into these type of application programs, it is currently being augmented and/or replaced by other types of input devices. For example, touch-sensitive pads can be "written" on with a stylus, such that a handwriting recognition program can be used to input the resulting characters into a program. As another example, voice-recognition programs, which work in conjunction with microphones attached to computers, also are becoming more popular. Especially for non-English language users, these non-keyboard type devices are popular for initially inputting text into programs, such that they can then be edited by the same device, or other devices like the keyboard.

A difficulty with the use of such input devices to input text into such programs is that there is no common mechanism by which to manage the text that these devices produce. Input device manufacturers, for example, develop drivers for the devices that output text in different ways, and thus interface with application programs in different ways. Application programs as well receive text input in different manners. Furthermore, within the prior art, input device drivers are one-way: they can only inject text into a document, and not, for example, view the text already within the document, which prevents them to some extent from having better accuracy in the text that they generate.

For these and other reasons, therefore, there is a need for the present invention.

SUMMARY OF THE INVENTION

The invention relates to a common text framework for applications having text-oriented documents, and input devices that generate text for such applications. In one embodiment, the framework provides for a mechanism through applications and handlers for input devices can interact, and includes a text store interface and a text input processor interface. The former interface permits an application having a document of primarily text to expose the document as an abstraction. The latter interface permits a handler for an input device to access the abstraction of the document and to insert additional text into the document. Furthermore, the common text framework allows for documents that include data other than plain text, such as objects and regions. Thus, objects can be inserted and queried within the document as well. Such objects may include pictures, handwriting controls, etc.

For the text store interface, in one embodiment, there are two different interfaces by which an application can expose its document as an abstraction. First, a text stream interface is provided in which the abstraction of the document appears as an array, where a position within the document is represented as an offset from the beginning of the array. Second, a dynamic text interface is provided in which a position within the document is represented as a floating anchor, such that two anchors can be compared relative to one another, which is useful, for example, for applications that store documents internally in a tree-type format.

For the text input processor interface, in one embodiment, there is a range object in which a range within the document is specified as two positions within the abstraction of the document. The handler thus inserts additional text into the document and accesses the abstraction of the document at the range specified by the range object. In addition, this interface permits the handler to attach a property or mark-up to the document at the range specified by the range object, which can then be persisted by the application, if desired.

Embodiments of the invention provide for advantages not found within the prior art. Significantly, all application programs expose their documents in a similar manner to the common text framework, and, similarly, all handlers for input devices interact with the framework in a similar manner. This means that any application program developed to expose its document as an abstraction to the common text framework, and any input device for which a handler is developed to access and inject text in a manner consistent with the framework, can be used with each other. Thus, an application program does not have to be hard coded to recognize new types of input devices; likewise, handlers for input devices do not have to be aware of each type of application program in which they will be used to input and access text.

Other advantages of the invention include bi-directionality, multi-modality, and mark-up aspects of different embodiments of the invention. With respect to bi-directionality, it is noted that handlers for input devices can access text within the abstractions of documents exposed to the framework as well as inject text thereinto. For example, having some knowledge regarding the context into which text is to be inserted may increase the accuracy of such text for handwriting and voice recognition applications, which is advantageous as compared to the prior art. With respect to multi-t modality, different input devices can be used simultaneously to enter and edit text within a document. And with respect to mark-up, by attaching properties to ranges of text within the document, handlers for input devices allow, for example, for information such as handwriting and voice recognition data to be persisted with the document in instances. Thus, where a user later goes back to edit a passage of text previously input by handwriting or voice, the original raw data can still be present, such that editing performance and accuracy can be better achieved as compared to the prior art.

Furthermore, in one embodiment, the common text framework allows for applications to expose additional context on streams or ranges of text. For example, a calendar application may place a "date" property on a given text field, or a word processor may expose a "legal" term to indicate a particular legal lexicon or language model. Such additional information can then be used by the recognition programs to improve their accuracy.

The invention includes computer-implemented methods, machine-readable media, computerized systems, and computers of varying scopes. Other aspects, embodiments and advantages of the invention, beyond those described here,

BRIEF DESCRIPTION OF THE DRAWINGS

FIG. 3 is a flowchart of a method according to an embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
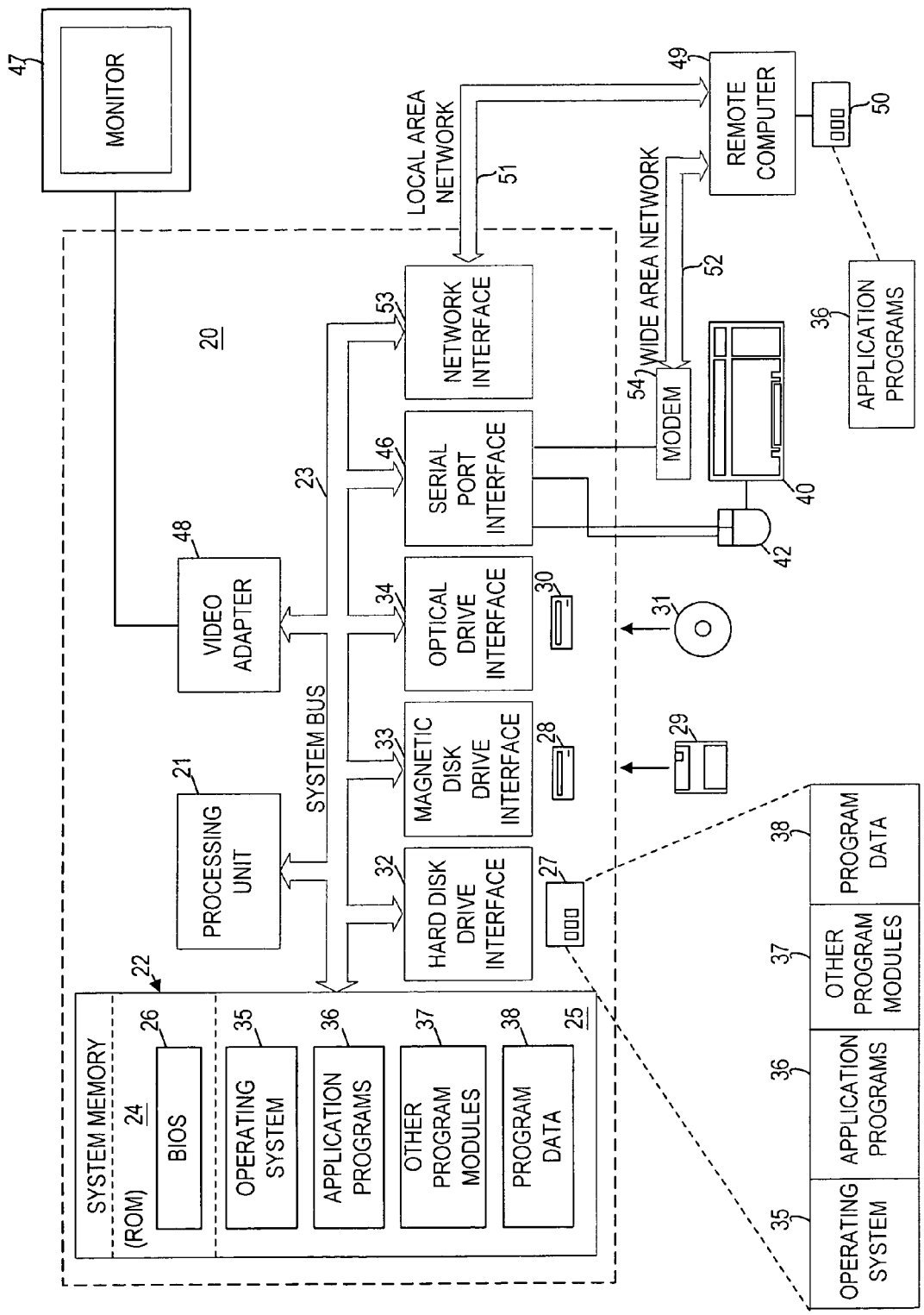
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Overview

Figure 2:
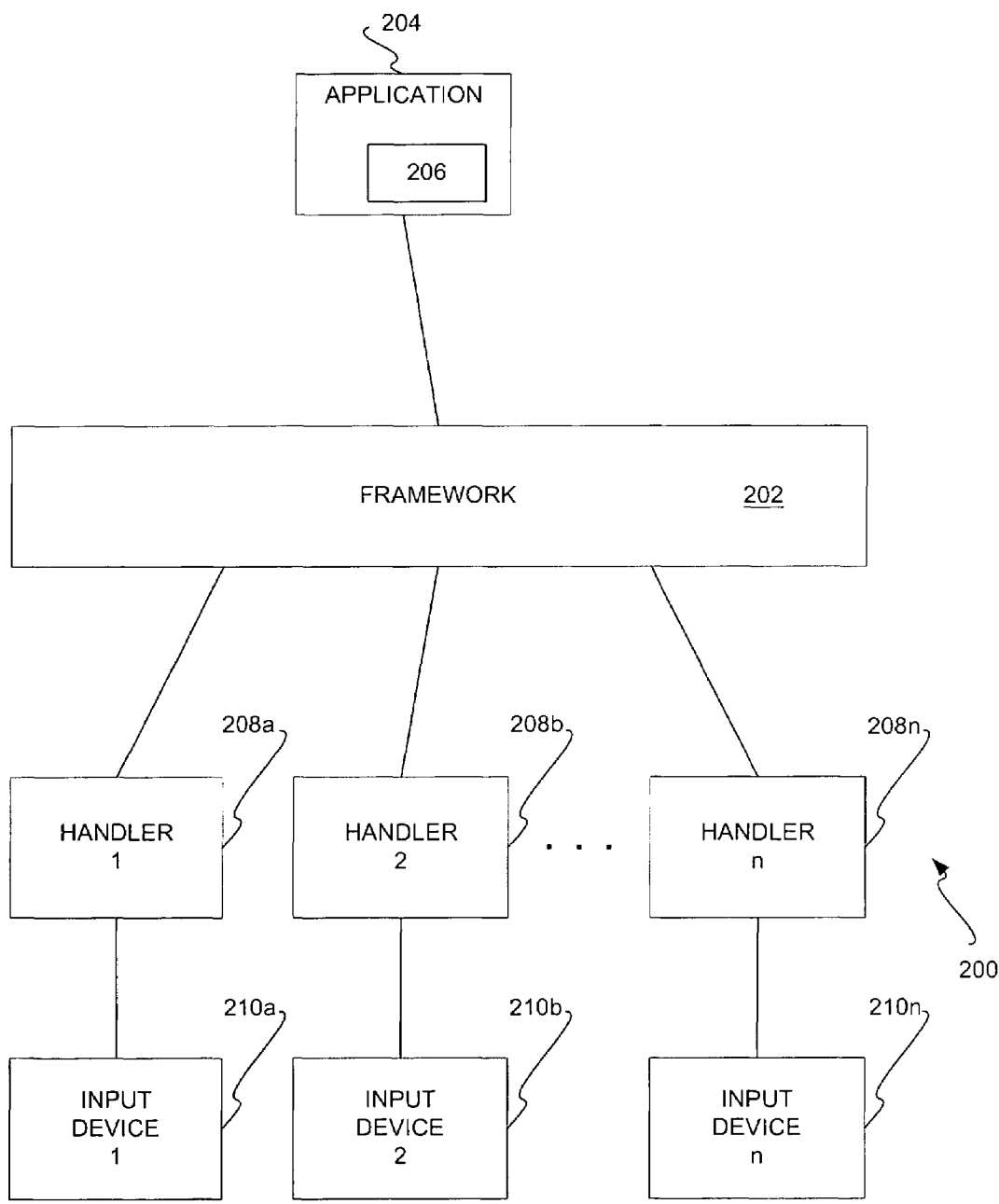
FIG. 2 is a diagram of a system according to an embodiment of the invention.

In this section of the detailed description, an overview of the invention in accordance with one embodiment thereof is presented. In the diagram of FIG. 2, the system 200 includes a common text framework 202, that provides for interactivity among an application program 204, and input device handlers 208a, 208b, . . . , 208n. The application program 204 is a program that has a document of primarily text. Such programs include, for example, word processors, text editors, as well as spreadsheets, presentation managers, etc.; the invention is not so limited. The application program 204 has a corresponding document 206, and exposes its documents to the framework as an abstraction to the framework 202, as opposed to, for example, the internal representation of the document 206.

Input device handlers 208a, 208b, . . . , 208n are the handlers, also referred to as processors or drivers, for corresponding input devices 210a, 210b, . . . , 210n. Such input devices include, for example, keyboards, touch pads on which text is "written" using a stylus and then handwriting-recognized by their corresponding handlers, microphones into which words are spoken and then voice-recognized by their corresponding handlers, etc.; the invention is not so limited. Input device handlers 208a, 208b, . . . , 208n access the abstractions of the documents and insert additional text into the documents via the framework 202.

It is noted that in one embodiment, device drivers are a level below what the framework is concerned with. That is, drivers still exist for speech or other input devices or other devices. The handler lies above the device driver. Thus, in this embodiment, the driver resolves a given hardware input into a kind of text or object, and the handler uses this text or object in conjunction with the framework to insert the text or object into the document.

Thus, the framework 202 is a mechanism by which application programs and input devices, through their handles, can interact with one another on a common basis, as is more particularly described in subsequent sections of the detailed description. It is noted that, as shown in FIG. 2, the framework 202 provides for bi-directionality and multi-modality—input device handlers, for example, can both retrieve text from abstractions of documents of the application programs as well as inject text into the documents, and multiple input devices can inject and edit text into the documents of the application programs. It is also noted that the framework 202 can the only manner by which input device handlers can interact with applications—that is, except via the framework 202, no interaction therebetween may be permitted, such as direct interaction without the use of the framework 202. However, it is noted that the invention itself is not so limited, and is inclusive of direct interaction as well. Thus, as the particulars of the common text framework are described in the subsequent sections of the detailed description—that is, particularly its various interfaces—it is noted that this limitation is desirably maintained in one embodiment.

Text Store Interface

Figure 3:
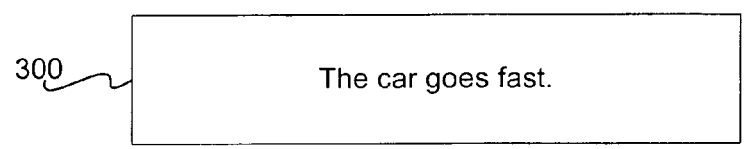
FIG. 3 is a diagram of a text-oriented document in conjunction with which embodiments of the invention can be practiced.

In this section of the detailed description, a text store interface, in accordance with which an application program is permitted to expose a document of primarily text to the common text framework, is described, according to an embodiment of the invention. An example of text that may be internally stored within a predetermined representation by an application is shown in the diagram of FIG. 3. The document 300 includes the text "The car goes fast." Embodiments of the invention particularly provide for two manners by which this text is exposed as an abstraction to the common text framework: via a text stream interface, and via a dynamic text interface. Each is now described in turn.

Figure 4:
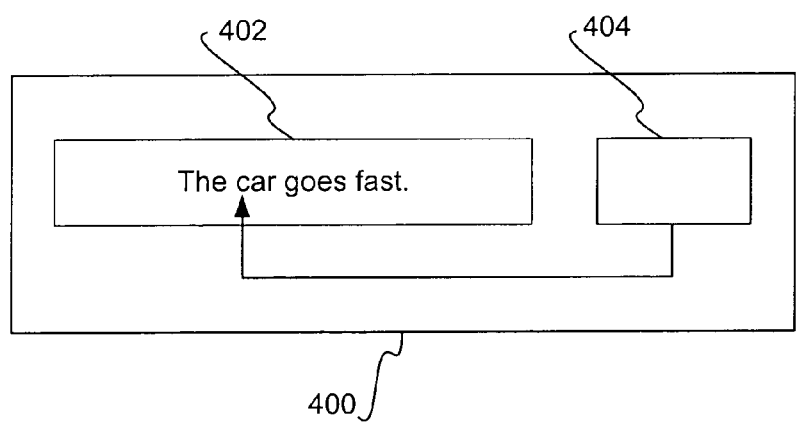
FIG. 4 is a diagram of a pictorial representation of a first type of interface by which applications can expose their documents as abstractions, according to an embodiment of the invention.

The diagram of FIG. 4 shows a pictorial representation of the text stream interface 400. The text stream interface 400 includes two parts: an array 402, and an offset 404. The array 402 is such that the abstraction of the document appears as an array, as this data structure is known within the art. Thus, the array 402 includes the text "The car goes fast." It is noted that the internal representation of this text by an application may differ from the array 402—that is, while the document 300 of FIG. 3 appears identical to the array 402 of FIG. 4, this is an example only, and many application programs store the internal representation of the document 300 different to that shown as the array 402. Furthermore, the interface 400 includes a an offset 404 that represents a position within the document, from the beginning of the array. Thus, as shown in FIG. 4, the offset 404 represents the position of the location of the character "c" within the array 402.

Figure 5:
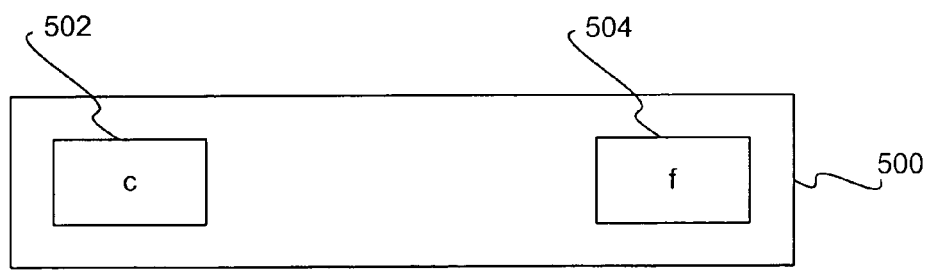
FIG. 5 is a diagram of a pictorial representation of a second type of interface by which applications can expose their documents as abstractions, according to an embodiment of the invention.

By comparison, the diagram of FIG. 5 shows a pictorial representation of the dynamic text interface 500. The dynamic text interface 500 represents positions within a document as floating anchors to positions within the document, an example of which is described in the next paragraph, although it is noted that the invention is not so limited to the description in the next paragraph. In the example of FIG. 5, two particular anchors are shown—an anchor 502 that references a position within the document that represents the location of the character "c" within the document, and an anchor 504 that references a position within the node that represents the location of the character "f" within the document.

It is noted that a given application program has a choice as to which interface, the text stream interface of FIG. 4 or the dynamic text interface of FIG. 5, by which to expose its internally represented text abstractly to the common text framework. Two different interfaces are provided for, because applications tend to store text in one of two overall ways. First, some documents are stored by their applications as a large array, or stream, of data. Such applications are likely to use the text stream interface of FIG. 4 to expose their data. Such applications are permitted to expose the text data "raw," such that the data may include formatting codes, etc., in addition to the actual text. That is, the text stream interface accommodates raw data embedded in the stream; however, application programs are free as to whether or not to take advantage of them.

Second, some documents are stored by their applications in a tree-based structure, which defies easy representation as an array. To prevent such applications from incurring large overhead in maintaining such the array-oriented representation of the text stream interface of FIG. 4, these applications are likely to use the dynamic text interface of FIG. 5 to expose their data to the framework as an abstraction. In such tree-based structures, each node of the tree represents one or more characters of text, formatting information, etc. Thus, the anchors of the dynamic text interface are used to track positions that correspond to nodes of such structures, for convenience of the applications owning such documents.

Text Input Processor Interface

Figure 6:
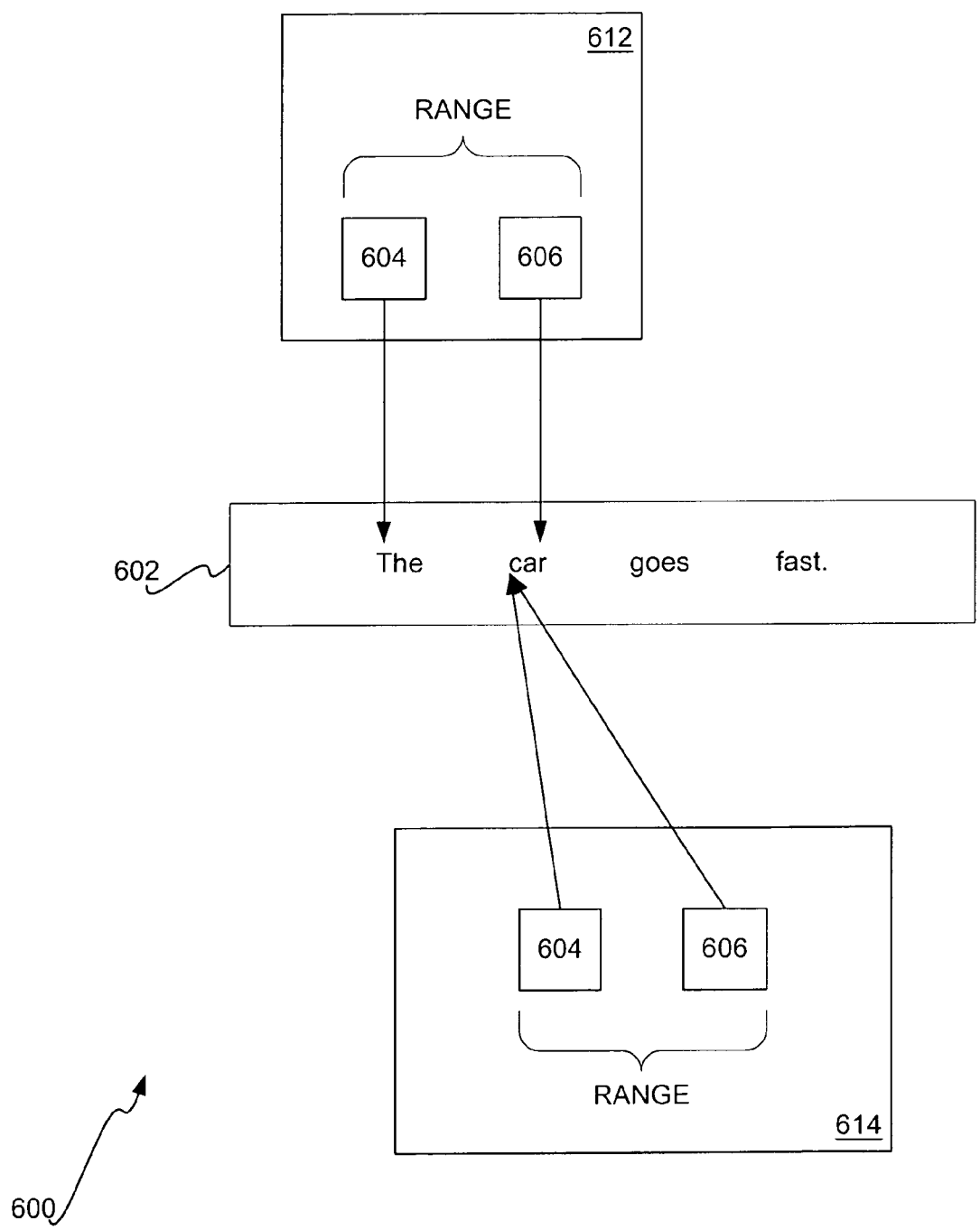
FIG. 6 is a diagram of a pictorial representation of an interface by which input device handlers can access and insert text of and into documents, according to an embodiment of the invention.

In this section of the detailed description, a text input processor interface, in accordance with which a handler for an input device is permitted to access the abstraction of a document of an application program and is permitted to insert additional text into the document, is described, according to an embodiment of the invention. The diagram of FIG. 6 shows a pictorial representation of a text input processor interface 600. Specifically, within the text 602, using the example "The car goes fast." of the previous section of the detailed description, two range objects 612 and 614 are shown referencing the text. Each range object specifies a range within the document 602 as two positions, such that a handle is able to insert additional text into the document 602 and accesses the abstraction of the document 602 at the range specified by the range object.

For example, the range object 612 references the two positions 604 and 606 within the document 602, to specify a range between the positions 604 and 606 corresponding to the text "The car". Thus, the handler for an input device is able to use the text input processor interface 600 to access this range of text. This can be used, for example, so that the handler is able to determine the context of a particular group of text into which the user is desiring to input further text, so that, for example, the new text can be more accurately recognized by the handler if input by voice or handwriting recognition. It is noted that this is advantageous as compared to the prior art, where input devices are typically not allowed to access text already entered into documents, but only inject new text thereinto.

As another example, the range object 614 references the two positions 608 and 610 within the document 602, to specify a "range" within the document 602 that has no width. In this way, the handler for an input device is able to use the text input processor interface 600 to inject, or insert, new text into the document at this range. Because the range is in fact a single point within the document, the common text framework knows where to insert text into the document, as can be appreciated by those of ordinary skill within the art.

In one embodiment, a text insertion point is handled in the following manner. The handler interface has a method that can be used to retrieve a range matching the location of the selection, where the selection, or insertion point, is a specific property of a document. The selection may or may not be empty. Thus, it represents the position a user can expect new text to appear, with the possibility of replacing existing text in the case of a non-empty selection. The position or length (viz., extent) of a selection can also be changed via another method in this embodiment.

Thus, using the range objects of the text input processor interface as represented pictorially in the diagram of FIG. 6, input device handlers are permitted to access and inject text of and into a document. In one embodiment, this is accomplished by two different methods. A first method is provided by the text input processor interface such that text supplied by the input device handler is inserted by the common text framework into the document at the range specified by the range object. A second method is provided by the text input processor interface such that the input device handler is able to request that the common text framework provide it with the text within the range specified by the range object. It is noted that in one embodiment, the positions specified within range objects are themselves floating positions, such that as text is entered and deleted, the positions retain their reference to a particular point within the text. That is, they are not fixed positions within the document.

Figure 7:
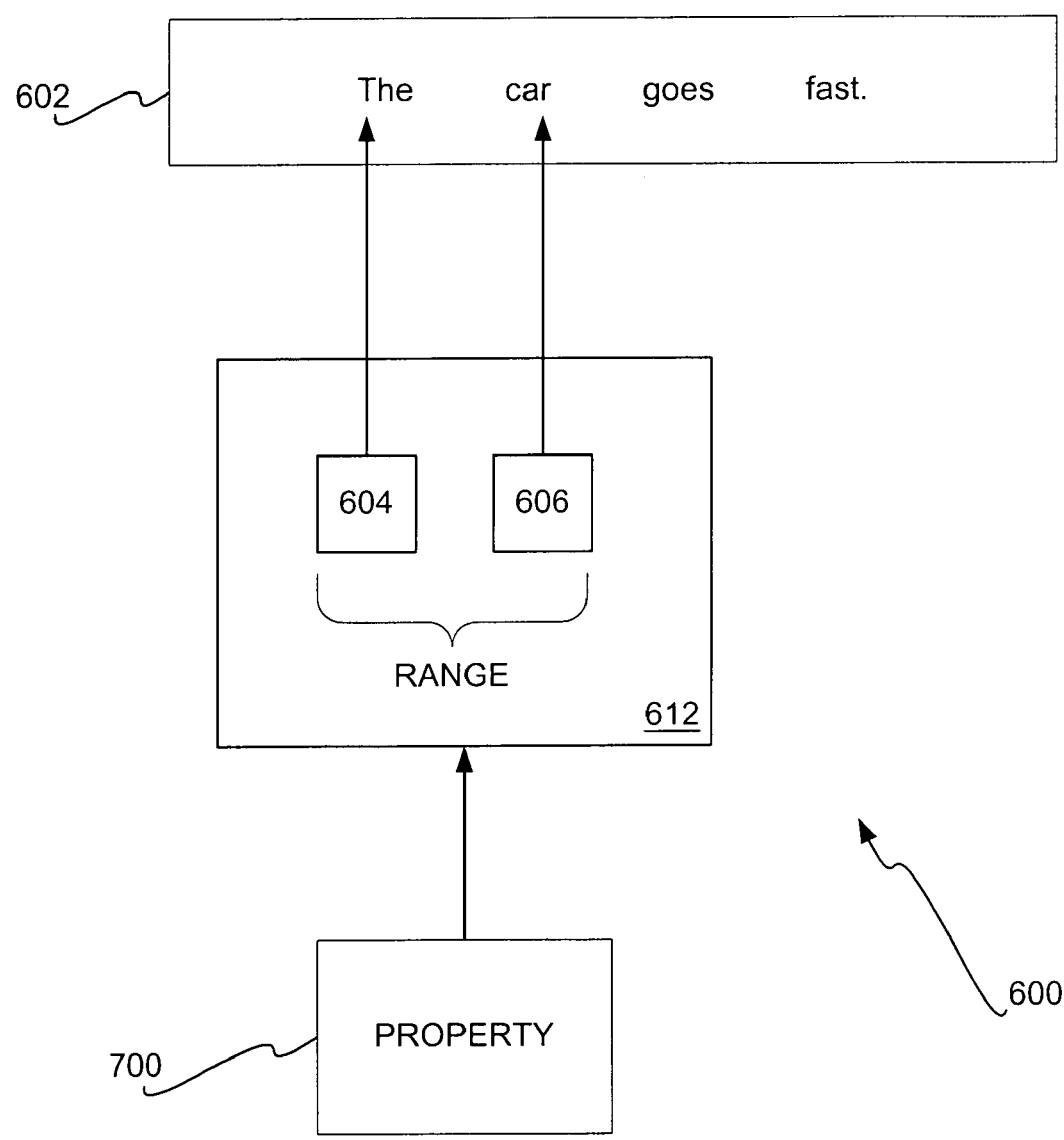
FIG. 7 is a diagram of a pictorial representation of the interface of FIG. 6 in which the handlers can additionally attach properties to documents, according to an embodiment of the invention.

Referring next to FIG. 7, a diagram of the pictorial representation of the text input processor interface 600 is shown with an additional feature thereof, the ability to attach properties to ranges within the document. As shown in FIG. 7, the range object 612 specifies a range within the text 602 as to the two positions 604 and 606. To this range of text, an input device handler has attached a property 700. A property is generally any type of data that is attached to a specific range by an input device handler, and which can then be persisted by the application owning the document of which the text 602 is a part. For example, a voice recognition input device handler may have associated information regarding the recognition of voice that resulted in the entry of the text within the range of the range object 612. Such information can include what is known in the art as lattice information, the original voice recording from which voice recognition was performed, etc. The handler may attach such information to the range, so that if the user later desires to correct text as recognized by the handler from voice data, the handler is able to access the original data and other information used thereby to generate the text. This can provide for better and more accurate text correction, for example.

As has been noted, application programs can persist the properties attached to documents thereof as desired. This may be, for example, a user-selectable option within an application program. An application program may desire to persist the properties so that later re-opening of the document provides the handlers with the information as described in the previous paragraph. An application program conversely may desire not to persist the properties if doing so makes the resulting data file overly large by some predetermined measure, such that storage and transmission thereof is inefficient. It is noted that to the application program, the properties appear as data attached to ranges within the text. That is, the data may or may not appear as meaningless to the application program itself, and is likely to be the former, not the latter. Furthermore, as has been noted, the handlers are not confined to input-only handlers. It is also arbitrary as to whether an application chooses to understand the properties a handler may attach.

In one embodiment, the attachment and access of properties by input device handlers to ranges of text within an abstraction of a document are again accomplished via one or more methods of the text input processor interface. Furthermore, specific properties referred herein as compartments can also be attached to the document, which reference the entire document generally, and not a specific or particular range thereof. Finally, in one embodiment, the application programs themselves can attach properties to their documents and ranges thereof, which can be exposed to the handlers through the common text framework, for example, to the input device handlers. These properties are generally referred to herein as modebias properties, although the invention is not so limited.

CONCLUSION

A common text framework by which applications and handlers for input devices can interact. It is noted that in one embodiment, each of the applications and input device handlers can be implemented as a computer program, executable on a computer as described previously in conjunction with FIG. 1. Furthermore, in one embodiment, a machine-readable medium, such as a memory, a removable storage like a CD-ROM or a floppy disk, a fixed storage like a hard disk drive, etc., has instructions stored thereon for execution by a processor, such as the computer of FIG. 1, to implement a computer program to provide the common text framework. Embodiments of the invention can also encompass systems in accordance with the description of the common text framework provided in the detailed description.

It is also noted that, although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A machine-readable medium having instructions stored thereon for execution by a processor to implement a computer program providing a common text framework through which applications and handlers for input devices can interact, comprising:
    a text store interface to permit an application having a document of primarily text to expose the document as an abstraction, the text store interface comprising,
    a text stream interface in which the abstraction of the document appears as an array, a position within the document represented as an offset from a beginning of the array,
    a dynamic text interface in which the abstraction of the document is such that a position within the document is represented as a floating anchor to a node, and
    a text processor input method for attaching a property to the document in at least one position in the document, wherein the property preserves originally entered data in order to facilitate text correction; and
    a text input processor interface to permit a handler for an input device to access the abstraction of the document and to insert additional text into the document.

2. The medium of claim 1, wherein the text store interface comprises:
    a method for selecting at least one of the text stream interface and the dynamic text interface by which to expose the document as the abstraction, wherein the method selects the text stream interface for documents stored as an array and the dynamic interface for documents stored in a tree-based structure.

3. The medium of claim 1, wherein the text input processor interface comprises a range object in which a range within the document is specified as two positions within the abstraction of the document, such that the handler inserts the additional text into the document and accesses the abstraction of the document at the range specified by the range object.

4. The medium of claim 3, wherein insertion is accomplished via a first method of the text input processor interface and the access is accomplished via a second method of the text processor interface.

5. The medium of claim 3, wherein the text input processor interface further permits the handler for the input device to attach the property to the document at the range specified by the range object.

6. A machine-readable medium having instructions stored thereon for execution by a processor to implement a computer program providing a common text framework through which applications and handlers for input devices can interact, comprising:
    a text input processor interface to permit a handler for an input device to access an abstraction of a document of mostly text of an application and to insert additional text into the document, comprising:
    a range object in which a range within the document is specified as two positions within the abstraction of the document, such that the handler inserts the additional text into the document and accesses the abstraction of the document at the range specified by the range object;
    a first method by which insertion is accomplished;
    a second method by which access is accomplished; and,
    a third method by which the handler is able to attach a property to the document at the range specified by the range object, the property providing access to original data used for insertion of text within the range.

7. The medium of claim 6, wherein the framework further comprises a text store interface to permit the application having the document of primarily text to expose the document as an abstraction.

8. The medium of claim 7, wherein the text store interface comprises:
   a text stream interface in which the abstraction of the document appears as an array, a position within the document represented as an offset from a beginning of the array; and,
   a dynamic text interface in which the abstraction of the document is such that a position within the document is represented as a floating anchor to a node,
   such that the application selects at least one of the text stream interface and the dynamic text interface by which to expose the document as the abstraction.

9. A method to preserve original raw data in a common text framework that provides interaction between an application and a plurality of input devices, the method comprising:
   receiving the original raw data from at least one of the plurality of input devices;
   storing the original raw data in a property that is attachable to a document;
   specifying a range within the document, wherein the range utilizes at least one floating position; and
   attaching the property to the range specified within the document.

10. The method of claim 9, wherein at least two of the plurality of input devices can simultaneously provide the original raw data.

11. The method of claim 9, further comprising:
   providing a context that includes additional information about the original raw data and
   utilizing the context to convert the received original raw data into text.

12. The method of claim 11, wherein the context is determined by the range specified within the document.

* * * * *